Figure 1:
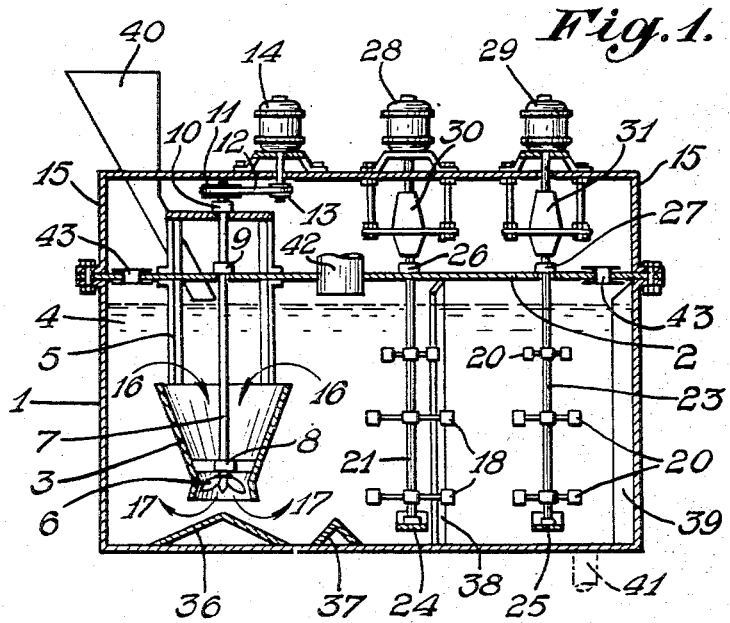

Aug. 23, 1960 A. MACQ 2,950,171
PROCESS AND APPARATUS FOR THE MANUFACTURE OF PHOSPHORIC ACID
Filed July 12, 1955

United States Patent Office 2,950,171
Patented Aug. 23, 1960

2,950,171

PROCESS AND APPARATUS FOR THE MANUFACTURE OF PHOSPHORIC ACID

André Macq, Brussels, Belgium, assignor to Union Chimique Belge, Societe Anonyme, Brussels, Belgium, a Belgian company, and Manufacture des Glaces et Produits Chimiques de Saint-Gobain, Chauny et Cirey, Société Anonyme, Paris, France, a French company, jointly Filed July 12, 1955, Ser. No. 521,587

Claims priority, application Belgium June 7, 1955

6 Claims. (Cl. 23—165)

The present invention relates to the manufacture of phosphoric acid from natural phosphates (calcium phosphate) and sulfuric acid.

It is known that phosphates, when acted upon by a calculated quantity of sulfuric acid, yield a slurry constituted essentially by phosphoric acid containing calcium sulfate in suspension. This latter is separated from the phosphoric acid by filtration, decantation and draining or in any other suitable manner. The yield of the manufacture depends on the manner in which the phosphate is acted upon and in which the precipitated calcium sulfate is separated. These two operations must be effected as completely as possible.

Direct action of the sulfuric acid upon the phosphate is to be avoided because the produced calcium sulfate would have the tendency of covering the phosphate grains and of prematurely stopping thereby the reaction. Generally the liquid used for acting upon the phosphate contains a certain proportion of phosphoric acid and it is even advantageous to bring the phosphate first into contact with a solution of phosphoric acid and then into contact with a solution of sulfuric acid.

The second important condition to be fulfilled is that of the separation and of the washing of the precipitated calcium sulfate. Whatever the means adopted for this purpose may be, the calcium sulfate should always be in the form of compact crystals. It is known that this result can be attained only by fulfilling very strict conditions in the manner in which the phosphate is acted upon. Experience shows, that with an $SO_4$ ion concentration corresponding to an $H_2SO_4$ content of 10 to 30 gr./liter there is obtained the optimum concentration for the formation of large crystals. Moreover, if during the preparation of the phosphoric acid the calcium sulfate passes through media of different compositions and temperatures, the crystallization risks to be irregular. In fact, it is known that, according to the recipitation conditions, calcium sulfate may crystallize in different manners. For producing calcium sulfate which is easy to filtrate and easy to wash, it is therefore important to avoid as far as possible any variation of the composition of the reaction medium.

In the past, the manufacture of phosphoric acid was effected in a discontinuous manner, in apparatus which were filled and emptied at each operation.

The plants for continuous manufacture which were constructed in the course of the last years comprise vessels arranged in series, in which there are distributed the phosphate to be acted upon, the phosphoric acid and the sulfuric acid, or the mixture of both acids. The aim pursued in these processes is to make as uniform as possible the composition of the medium in which the reaction takes place. It has been proposed to recycle the reacting liquid in such a manner as to further increase thereby the uniformity of the precipitation conditions of the calcium sulfate crystals. However it has been found that in this manner there is set up a marked stream of the material, resulting in the formation of a series of reaction media of different compositions and even of different temperatures. For overcoming these drawbacks the number of reaction vessels should be increased, and this would result in a considerable increase of the required space, of the costs of installation of tanks and pipings and of consumption of the power required for keeping the calcium sulfate in suspension within the liquid. On the other hand, whatever the importance of recirculation may be, it is practically impossible to take advantage thereof for the whole of the reaction mass.

There exist also processes for manufacturing phosphoric acid in a tank divided into a certain number of compartments. One succeeds in this manner to reduce the space required for the plant. But the other abovementioned drawbacks subsist, viz: the conditions of temperature, of concentration and of $SO_4$ ion content vary from one compartment to the other, all this being a bar to the formation of large calcium sulfate crystals.

The process according to the present invention consists in effecting the manufacture of phosphoric acid in a continuous manner in a single vessel without compartments by stirring therein the reaction medium in such a manner as to keep in said medium homogeneous reaction conditions especially those required for properly acting upon the phosphate and for the formation of calcium sulfate crystals.

By virtue of the homogeneity of the mixture contained in the reaction vessel and in spite of the regular supply of the phosphate and of the acids, the drawing off of the reaction products can be effected in a continuous manner from any point whatever.

The stirring must be of particular efficiency at the point where the raw materials are introduced into the reaction vessel, so that immediately after their introduction said materials will be brought into contact with a great volume of liquid, this securing simultaneously the production of a homogeneous mass and a high reaction speed. If the dimensions of the apparatus are such that a single stirrer will not be sufficient for maintaining the homogeneity of working conditions in the whole mass, there will be used several stirring devices, which may be of different types.

It will be advantageous to produce in the mass of the reaction products two currents or streams which meet each other and are fed, the one with phosphate, the other with sulfuric acid. The one of said currents may be for instance of vertical direction and the other of horizontal direction.

The present invention concerns also a tank or vessel suitable for the execution of the process described, said tank including means for supplying the raw materials thereto, means for evacuating therefrom a quantity of the produced slurry corresponding to the quantity of introduced materials, and stirring means, viz:

On the one hand a device for producing a forced circulation of the slurry in the zone where one of the raw materials (for instance phosphates) is introduced, this device bringing said slurry into contact with said raw material at a delivery rate of the slurry which is considerable in comparison with that of said raw material;

On the other hand, a stirring device placed in the admission zone of the other raw material (for instance sulfuric acid) and propulsing the slurry charged with this material into the action zone of the device which produces the forced circulation.

In the accompanying drawing there is shown by way of example an apparatus for executing the process according to the present invention, and suitable for treating, per cubic metre of device capacity, 1 ton of phosphate per 24 hours.

In general terms, this apparatus comprises, within a tank without compartments, a forced circulation device constituted by a propeller rotating within the smaller downwardly directed opening of a funnel, the greater upwardly directed opening of which is adapted to receive one of the raw materials, for instance the phosphate, which may be accompanied by phosphoric acid. The propeller produces inside the funnel a downwardly directed high delivery current, and outside the funnel an upwardly directed current of slurry.

On the other hand the apparatus comprises a stirring device constituted by stirring paddles arranged on vertical shafts, this stirring device homogenizes the slurry in the zone into which sulfuric acid is admitted and produces at the same time a horizontal circulation tending to withdraw a portion of the slurry from the upwardly directed vertical current produced by the first mentioned forced circulation device, for diffusing such portion of slurry in the horizontal circuit and for replacing said portion of slurry withdrawn from the upwardly directed vertical current, by slurry of the horizontal circuit.

Figure 2:
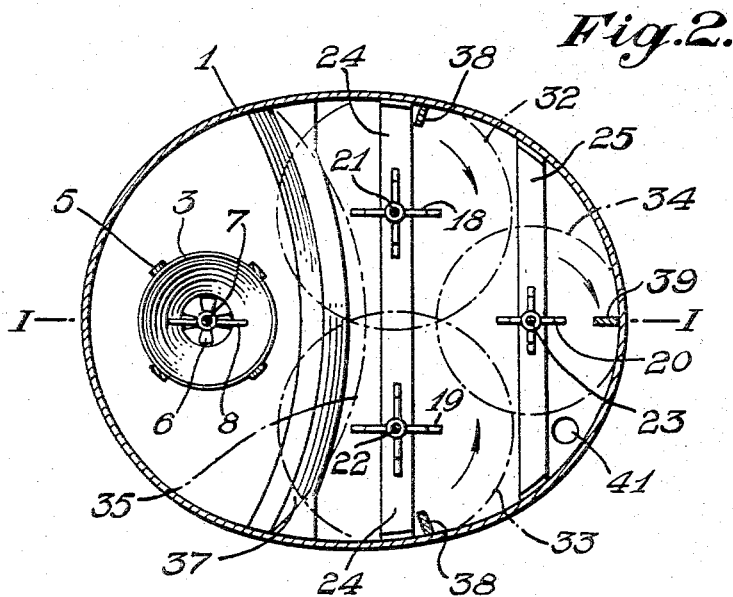

In the accompanying drawing, Fig. 1 reprsents diagrammatically a vertical longitudinal section through an apparatus according to the present invention along the line I—I, Figure 2, whereas Figure 2 represents a plan view of the apparatus from which the top cover and certain parts mounted on it have been removed.

The apparatus comprises a tank 1, made from an acid proof material and closed at the top by a cover plate 2. Inside said tank there is arranged a funnel 3 merging into the liquid 4 contained in the tank, said funnel being fixed to the cover 2 by posts 5 and being provided with a propeller 6 mounted on a vertical shaft 7 supported in bearings 8, 9, 10. The bearings 9 and 10 are mounted on the cover plate 2 and the shaft 7 is provided at its upper end with a pulley 11 driven through a belt transmission 12, 13 by an electric motor 14 arranged on a support 15 fixed to the cover plate 2. The propeller 6 is driven by the motor 14 in such a manner as to set up in the tank an intense circulation of the liquid 4 in the direction indicated by arrows 16, 17, i.e. in a downward direction inside the funnel 3.

On the other hand the tank 1 is provided with stirrers such for instance as paddle stirrers 18, 19 and 20, mounted on vertical shafts 21, 22, 23 supported by bearings 24, 25 fixed for instance to the tank 1, and by bearings 26, 27 fixed to the cover plate 2. The stirrer shafts 21, 22, 23 are driven for instance by distinct electric motors 28, 29 through the intermediary of change speed gears and reversing gears 30, 31 fixed to the support 15.

Obviously the driving and transmission systems used in the apparatus according to the invention could be of any other suitable type, for instance of a type comprising one electric motor imparting rotation of variable speeds and directions to the propeller and to the paddle stirrers through any suitable transmission gears.

In general terms, the dimension and functional features (speed and sense of rotation) of the means for setting up in the tank a circulation of the treated materials in suitable directions and of suitable intensities, such as stirrers 18, 19, 20 are chosen in such a manner, that the zones of influence of their activity, diagrammatically indicated in Figure 2 by the circles 32, 33, 34 intersect each other, so as to prevent the formation, within the medium contained in the tank, of too slow moving zones or of zones of stagnation.

Likewise the propulsive capacity of the forced circulation device constituted for instance by the propeller 6 combined with funnel 3, is determined in such a manner that the zone of the liquid surface influenced by said propeller device, such zone being diagrammatically shown in Figure 2 by the arc line 35, penetrates into the stirring zones of stirrers 18 and 19.

In order to facilitate the dispersion of the liquid issuing from the funnel 3, the bottom of the tank is provided, in front of the funnel outlet, with a conical protuberance 36 separated by a low barrier 37 of suitable cross section, for instance of triangular cross section, and of arcuate longitudinal form (see Figure 2), from the tank bottom portion situated in front of the stirrers 18, 19, 20. Moreover, vertically extending baffle elements 38 and 39 are fixed to the wall of the tank in order to improve the stirring action produced in the slurry by the stirrers 18, 19, 20.

Finally, the tank is provided with a hopper 40 for feeding the mixture of phosphate and phosphoric acid into the funnel 3, with an outlet 41 connected through a conduit and a pump (not shown) to the slurry filter (not shown) and with an inlet pipe 42 for the admission of sulfuric acid. The cover plate 2 is provided with vents 43.

The operation of the apparatus is as follows:

Raw phosphate is introduced through hopper 40 into the funnel 3, the upper edge of which is situated below the liquid level 4. At the same time there are introduced through hopper 40 into the funnel 3 phosphoric acid and washing water issuing from the slurry filter, sulfuric acid being admitted to the tank through the inlet 42.

Constancy of the liquid level in the tank is secured by continuously pumping the slurry through the outlet 41 to the slurry filter.

The propeller 6 sets up an intense circulation of the slurry inside the funnel 3 from top to bottom of the latter. The slurry issuing from the lower opening of the funnel tends to rise again to the surface of the liquid, but this ascending movement is crossed by the action of the stirrers 18 and 19 which tend to disperse such slurry horizontally within the whole of the liquid contained in the tank, replacing the same by the acid slurry which is carried towards the upper edge of the funnel under the influence of the vertically descending current inside the latter.

I claim:

1. A process for the continuous manufacture of phosphoric acid from natural phosphate and sulfuric acid which comprises the steps of establishing a single horizontally-elongated reaction zone, establishing a reaction medium in said reaction zone comprising the reaction product of sulfuric acid upon natural phosphate, establishing adjacent one end of said horizontally-elongated reaction zone containing said reaction medium a vertically-moving toroidal current in said reaction medium around a vertical axis, the inner portion of said toroidal current being caused to move downwardly while undergoing converging-diverging confinement and the outer portion of said toroidal current being caused to move upwardly in the other direction around said inner confined portion, simultaneously establishing in a second portion of said reaction zone which is spaced laterally with respect to said toroidal current a plurality of vertically superposed horizontal currents and causing said currents to move at least partially in closed paths, said superposed currents comprising upper horizontal currents and lower horizontal currents, causing a first portion of the upwardly flowing outer portion of said toroidal current to commingle with some of said horizontal currents, causing the remaining horizontal currents to commingle with the remainder of the vertically moving outer portion of the toroidal current and causing said remaining horizontal currents to be sucked into the inner downwardly-moving portion of the toroidal current continuously introducing natural phosphate and washing water from the filtration of the slurry of previously formed product into the upper end of the inner portion of said toroidal current, continuously introducing sulfuric acid into said upper horizontal currents, and continuously withdrawing said reaction product from said reaction zone.

2. A process for the continuous manufacture of phosphoric acid from natural phosphate and sulfuric acid which comprises the steps of establishing a single horizontally-elongated reaction zone, establishing a reaction medium in said reaction zone comprising the reaction product of sulfuric acid upon natural phosphate, establishing adjacent one end of said horizontally-elongated reaction zone containing said reaction medium a vertically-moving toroidal current in said reaction medium around a vertical axis, the inner portion of said toroidal current being caused to move downwardly while undergoing converging-diverging confinement and the outer portion of said toroidal current being caused to move upwardly around said inner confined portion, simultaneously establishing in a second portion of said reaction zone which is spaced laterally with respect to said toroidal current a plurality of vertically superposed horizontal currents and causing said currents to move at least partially in closed paths, said superposed currents comprising upper horizontal currents and lower horizontal currents, causing the lower portion of the upwardly flowing outer portion of said toroidal current to commingle with the lower horizontal currents, causing the upper horizontal currents to commingle with the upper portion of the upwardly moving outer portion of the toroidal current and causing said upper horizontal current to be drawn into the downwardly flowing inner portion of the toroidal current, continuously introducing natural phosphate and washing water from the filtration of the slurry of previously formed product into the upper end of the inner portion of said toroidal current, continuously introducing sulfuric acid into the upper horizontal currents, and continuously withdrawing said reaction product from said reaction zone.

3. A process for the continuous manufacture of phosphoric acid from natural phosphate and sulfuric acid which comprises the steps of establishing a single horizontally-elongated reaction zone, establishing a reaction medium in said reaction zone comprising the reaction product of sulfuric acid upon natural phosphate, establishing adjacent one end of said horizontally-elongated reaction zone containing said reaction medium a vertically-moving toroidal current in said reaction medium around a vertical axis, the inner portion of said toroidal current being caused to move downwardly while undergoing converging-diverging confinement and the outer portion of said toroidal current being caused to move upwardly around said inner confined portion, simultaneously establishing in a second portion of said reaction zone which is spaced laterally with respect to said toroidal current a plurality of vertically superposed horizontal currents and causing said currents to move at least partially in closed paths, said superposed currents comprising upper horizontal currents and lower horizontal currents, causing the lower portion of the upwardly flowing outer portion of said toroidal current to commingle with the lower horizontal currents, causing the upper horizontal currents to commingle with the upper portion of the upwardly moving outer portion of the toroidal current and causing said upper horizontal currents to be drawn into the downwardly flowing inner portion of the toroidal current, continuously introducing natural phosphate and washing water from the filtration of the slurry of previously formed product into the upper end of the inner portion of said toroidal current, continuously introducing sulfuric acid into the upper horizontal currents, and continuously withdrawing said reaction product from said reaction zone at a point remote from said toroidal current.

4. Apparatus for continuously producing phosphoric acid from natural phosphate and sulfuric acid which comprises a chamber having peripheral walls defining a single horizontally-elongated reaction zone, means for introducing said phosphoric acid into said chamber, and means for introducing said natural phosphate into said chamber to provide in said chamber a reaction medium, a vertically-extending agitating means adjacent one end of said chamber and adjacent one of said introducing means, a converging-diverging shield surrounding a portion of said agitating means to cause a downward flow in said chamber when said agitating means is actuated and to create adjacent one end of said horizontally-elongated reaction zone a toroidal current in said reaction medium around a vertical axis, the inner portion of said toroidal current moving vertically while undergoing converging-diverging confinement by the action of said shield and the outer portion of said toroidal current moving vertically in the other direction around said converging-diverging shield, a plurality of second vertically-extending agitating units in said chamber laterally-spaced from said first-named agitating means and laterally spaced from each other, said plurality of second agitating units freely and directly communicating with each other through said reaction zone and being free of lateral confinement except by said walls of said chamber and each of said plurality of second agitating units being constructed to induce upon rotation a plurality of horizontally-directed zones of movement in said reaction medium, with said second agitating units being positioned in sufficiently close proximity that the horizontally-directed zones of movement which they induce when rotating overlap one another, with the zones of movement induced by at least one of said second agitating units overlapping the toroidal current created by said first agitating means, and means for withdrawing the reaction product of said natural phosphate and said sulfuric acid from said chamber.

5. Apparatus for continuously producing phosphoric acid from natural phosphates and sulfuric acid which comprises a chamber having peripheral walls defining a single horizontally elongated reaction zone, means for introducing said phosphoric acid into said chamber, and means for introducing said natural phosphate into said chamber to provide in said chamber a reaction medium, a vertically-extending agitating means adjacent one end of said chamber and adjacent one of said introducing means, said agitating means comprising a propeller mounted on a vertical shaft, a converging-diverging shield surrounding a portion of said agitating means, said shield having a downwardly opening converging lower end portion and an upwardly opening upper end portion to cause a downward flow in said chamber when said agitating means is actuated and to create adjacent one end of said horizontally-elongated reaction zone a toroidal current in said reaction medium around a vertical axis, the inner portion of said toroidal current moving vertically while undergoing converging-diverging confinement by the action of said shield and the outer portion of said toroidal current moving vertically in the other direction around said converging-diverging shield, the upper end of said shield being positioned to receive the material flowing from one of said introducing means, a plurality of second vertically-extending agitating units in said chamber laterally-spaced from said first-named agitating means and laterally spaced from each other, said plurality of second agitating units freely and directly communicating with each other through said reaction zone and being free of lateral confinement except by said walls of said chamber and each of said plurality of second agitating units being constructed to induce upon rotation a plurality of horizontally-directed zones of movement in said reaction medium with said second agitating units being positioned in sufficiently close proximity that the horizontally directed zones of movement which they induce when rotating overlap one another, with the zones of movement induced by at least one of said second agitating units overlapping the toroidal current created by said first agitating means, and means for withdrawing the reaction product of said natural phosphate and said sulfuric acid from said chamber.

6. Apparatus for continuously producing phosphoric acid from natural phosphates and sulfuric acid which comprises a tank having peripheral walls defining a single horizontally elongated reaction zone, said tank having a bottom and rounded end and side walls with the radius of curvature of the end walls being smaller than the radius of curvature of the side walls, a converging-diverging shield positioned inside said tank in proximity to one of its end walls in one half of said tank and spaced from the tank bottom, said shield having a downwardly converging upper portion merging with a downwardly diverging lower portion, a vertically extending agitating shaft disposed along the axis of said shield and a propeller mounted on said shaft and disposed in the lower end portion of said shield, means for driving said shaft to impart rotation to said propeller and to create adjacent one end of said horizontally-elongated reaction zone a toroidal current in said reaction medium around a vertical axis, the inner portion of said toroidal current moving vertically while undergoing converging-diverging confinement by the action of said shield and the outer portion of said toroidal current moving vertically in the other direction around said converging-diverging shield, means for feeding raw phosphate and phosphoric acid into the upper portion of said shield, a conical member extending upwardly from the bottom of said tank with its apex on the axis of said shield, and a horizontally-extending arcuate barrier on said bottom having an upwardly converging cross-section disposed adjacent said conical member and lying between said conical member and the opposite end wall of said tank, a plurality of vertically-extending shafts carrying paddle stirrers in said tank in the half of said tank other than the half in which said funnel is disposed and laterally spaced from said shield, said paddle stirrers freely and directly communicating with each other through said zone and being free of lateral confinement except by said walls of said tank, and each of said paddle stirrers being constructed to induce upon rotation a plurality of horizontally directed streams in said reaction medium with the paddle stirrers being positioned in sufficiently close proximity that the horizontally-directed streams which they induce when rotating overlap one another, means for driving said shafts carrying said stirrers at variable speeds in reversible directions, means for feeding sulfuric acid into said tank at a point between said shield and said last-named shafts, stationary baffle means extending inwardly from the walls of said tank adjacent each of said last-named shafts, means for withdrawing the contents of said tank, said shaft carrying said propeller and said shafts carrying said paddle stirrer being arranged in such manner that the vertical streams issuing from said shield will intersect the horizontal streams produced by said paddle stirrers to effect homogeneous mixing of the contents of said tank, and a cover for said tank provided with at least one vent.

References Cited in the file of this patent

UNITED STATES PATENTS

| | | |
|---|---|---|
| 1,383,912 | Doyle | July 5, 1921 |
| 1,789,320 | Overbury | Jan. 20, 1931 |
| 1,836,672 | Larsson | Dec. 15, 1931 |
| 2,308,220 | Waggaman | Jan. 12, 1943 |
| 2,361,444 | Zbornik | Oct. 31, 1944 |
| 2,384,773 | Shoeld | Sept. 11, 1945 |
| 2,415,423 | Franz et al. | Feb. 11, 1947 |
| 2,435,228 | Mann | Feb. 3, 1948 |
| 2,438,204 | Castner | Mar. 23, 1948 |
| 2,635,955 | Constant | Apr. 21, 1953 |

OTHER REFERENCES

Chemical Engineers Handbook, Perry, 3rd ed., McGraw-Hill, pp. 1212–14.